United States Patent
Nau et al.

(10) Patent No.: US 7,263,832 B2
(45) Date of Patent: Sep. 4, 2007

(54) METHOD AND ARRANGEMENT FOR CONTROLLING AN ELECTRICALLY OPERATED CHARGER

(75) Inventors: Michael Nau, Dornhan/Aischfeld (DE); Ingo Immendoerfer, Buehl (DE); Martin-Peter Bolz, Buehl (DE); Michael Baeuerle, Ditzingen-Heimerdingen (DE); Carsten Reisinger, Stuttgart (DE); Guido Porten, Enzweihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/355,170

(22) Filed: Jan. 31, 2003

(65) Prior Publication Data

US 2003/0141851 A1 Jul. 31, 2003

(51) Int. Cl.
*F02B 33/44* (2006.01)

(52) U.S. Cl. .............. 60/606; 60/597; 60/598; 60/607; 60/608; 60/609

(58) Field of Classification Search .......... 320/137, 320/134, 136, 104, 128; 180/69.3, 69.4, 180/69.5, 65.3, 69.6, 65.1; 123/559.1, 568.21, 123/561, 565; 60/602, 606–609, 611
See application file for complete search history.

(56) References Cited

U.S. PATENT DOCUMENTS

| | | | | |
|---|---|---|---|---|
| 4,434,778 A | * | 3/1984 | Morita et al. ............... | 123/587 |
| 5,066,866 A | * | 11/1991 | Hallidy ....................... | 290/1 R |
| 5,490,572 A | * | 2/1996 | Tajiri et al. ................. | 180/65.1 |
| 5,586,537 A | * | 12/1996 | Tomisawa et al. .......... | 123/435 |
| 5,608,310 A | * | 3/1997 | Watanabe .................... | 322/29 |
| 5,704,323 A | | 1/1998 | Gardell et al. | |
| 5,713,426 A | * | 2/1998 | Okamura ..................... | 180/65.3 |
| 5,927,248 A | * | 7/1999 | Lang et al. .................. | 123/396 |
| 6,049,196 A | * | 4/2000 | Arai et al. .................... | 322/61 |
| 6,182,449 B1 | * | 2/2001 | Halimi et al. ................ | 60/612 |
| 6,226,305 B1 | * | 5/2001 | McLoughlin et al. ........ | 370/532 |
| 6,415,602 B1 | * | 7/2002 | Patchett et al. .............. | 60/286 |
| 6,705,084 B2 | * | 3/2004 | Allen et al. .................. | 60/608 |

FOREIGN PATENT DOCUMENTS

| | | |
|---|---|---|
| DE | 101 24 543 | 11/2002 |
| EP | 1070837 | 1/2001 |

* cited by examiner

*Primary Examiner*—Karl Easthom
*Assistant Examiner*—Samuel Berhanu
(74) *Attorney, Agent, or Firm*—Walter Ottesen

(57) ABSTRACT

The invention is directed to a method and an arrangement (10) for controlling an electrically operated charger (1), which essentially prevent a sudden drop in voltage with the run-up of the electric charger. A drive signal (AS) is formed, which drives the electric charger (1). The rate of change of speed for an increase of the rpm of the electric charger (1) is pregiven in dependence upon the instantaneous supply voltage (UV).

4 Claims, 2 Drawing Sheets

METHOD AND ARRANGEMENT FOR CONTROLLING AN ELECTRICALLY OPERATED CHARGER

BACKGROUND OF THE INVENTION

German patent publication 101 24 543 discloses a method and an arrangement for controlling an electrically operated charger. The electrically operated charger cooperates with an exhaust-gas turbocharger for compressing the inducted air of an internal combustion engine. Furthermore, a drive signal is formed which drives the electric charger. The drive signal is determined in dependence upon a pressure ratio which is to be adjusted across the electric charger.

SUMMARY OF THE INVENTION

The method of the invention is for controlling an electrically operated charger and includes the steps of: forming a drive signal (AS) for driving the electrically operated charger; and, providing a rate of change of speed for an increase of the rpm of the electrically operated charger in dependence upon an instantaneous supply voltage (UV).

The method and arrangement of the invention for controlling an electrically operated charger afford the advantage that a change of speed for an increase of the rpm of the electric charger is pregiven in dependence upon an instantaneous supply voltage. In this way, it can be prevented that a noticeable darkening of the instrument lighting and of the headlights takes place for a short time especially when there is a poor charging state of a vehicle battery as a consequence of a sudden voltage drop. The vehicle battery supplies the supply voltage.

It is especially advantageous that the change of speed for an increase of the rpm of the electric charger is reduced when the instantaneous supply voltage drops below a pregiven voltage value. For a suitable selection of the pregiven voltage value, the unwanted sudden voltage drops at the vehicle battery are especially simply and effectively avoided.

The rate of change of speed for an increase of the rpm of an electric charger can be especially simply pregiven by limiting the current drawn by the electric charger. With these measures, the unwanted sudden voltage drops are furthermore especially rapidly and effectively avoided because a drawing of current by the electric charger which is too high defines the direct reason of these sudden voltage drops.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
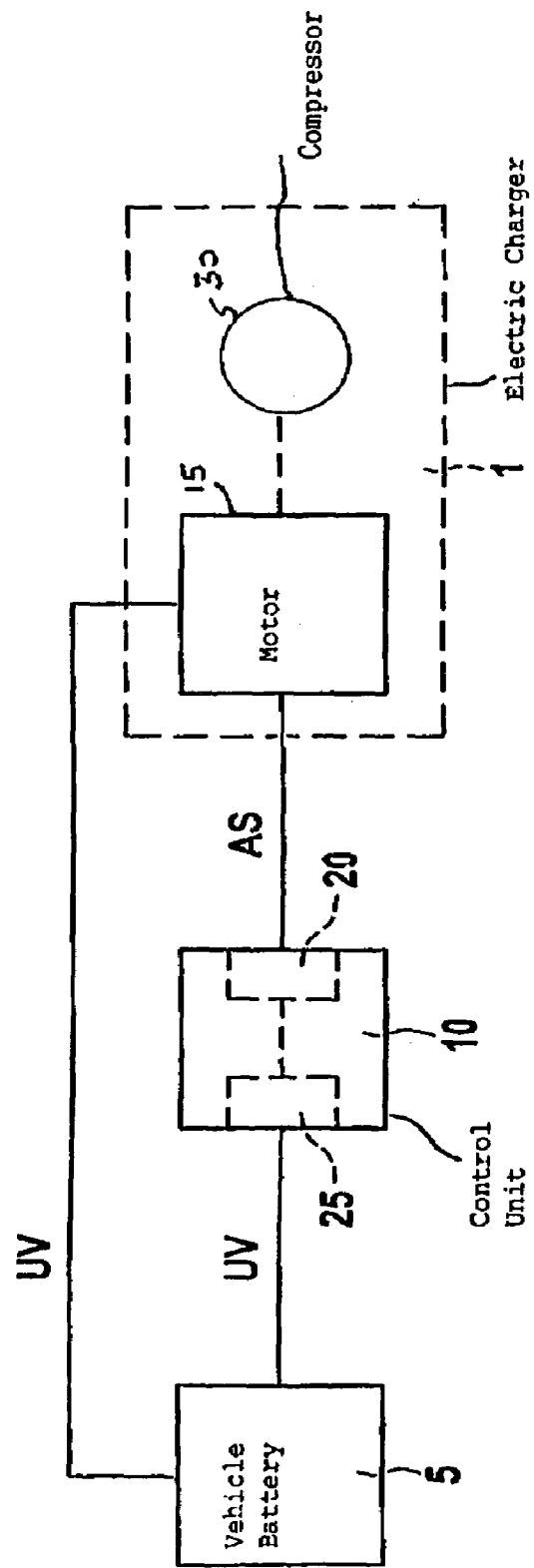
FIG. 1 is a block circuit diagram showing the arrangement of the invention for controlling an electrically operated charger; and, FIG. 2 is a sequence diagram for the sequence of the method of the invention for controlling an electrically operated charger.

In FIG. 1, reference numeral 1 identifies an electrically operated charger. The electric charger 1 includes a motor 15 for driving a compressor (not shown) via a drive shaft (not shown). The compressor of the electric charger 1 can, for example, cooperate with an exhaust-gas turbocharger for compressing the inducted air of the internal combustion engine. The engine can, for example, be provided for driving a motor vehicle. The motor 15 of the electric charger 1 is driven by an arrangement 10 via a drive signal AS. The arrangement 10 thereby defines a control unit and is characterized as such in the following. Furthermore, a battery 5 is provided, which supplies the control unit 10 and the motor 15 of the electric charger 1 with a supply voltage UV. The arrangement shown in FIG. 1 is arranged hereinafter in a motor vehicle by way of example as indicated above. The battery 5 is then the vehicle battery. This battery provides, for example, a supply voltage UV of 12 V.

The electric charger 1 is used in the above-described application, for example, to reduce the so-called turbo-hole, that is, to reduce the delayed buildup of the charging pressure in internal combustion engines having exhaust-gas turbocharging. In order to realize the maximum potential of the electric charger 1 and to obtain the maximum possible additional compression from the electric charger 1, it is necessary to bring the motor 15 and therefore the compressor of the electric charger 1 as rapidly as possible to its maximum rpm. The increased electric current which is necessary for a short time leads to a sudden drop in voltage at the vehicle battery 5 and therefore in the entire on-board electric system of the motor vehicle. In extreme cases, this can lead to the situation that the instrument illumination and/or the headlights of the vehicle noticeably darken for a short time. This phenomenon is dependent upon the instantaneous supply voltage UV minimally occurring during the acceleration of the rpm of the motor 15 to the maximum rpm. The supply voltage UV supplies the entire on-board electrical system and therefore also the instrument lighting and the headlights. The phenomenon occurs with intensified effect when there is a poor charging state of the vehicle battery which becomes manifest in a reduced rest voltage of the vehicle battery 5, that is, a reduced supply voltage UV in the unloaded state.

The described phenomenon can be ameliorated by a slower run-up of the electric charger 1. This means that the run-up speed of the motor 15 up to the maximum rpm or up to the required desired rpm must be reduced. This desired rpm can also be less than the maximum rpm. This run-up speed is equal to the acceleration or rate of change of speed with which the rpm of the motor 15 is increased. For a reduced rate of change of speed, the increase of the rpm of the motor 15 is slowed. The motor 15 can, for example, be an electric motor. Here, the motor 15 needs to supply less torque and therefore the electric current drawn by the motor 15 is lower.

Since the supply voltage UV is supplied to the control unit 10, the supply voltage UV is known in the control unit 10. In this way, the current drawn by the motor 15 of the electric charger 1 can be pregiven or controlled via the drive signal AS by the control unit 10 in dependence upon the instantaneous supply voltage UV.

In the control unit 10, a pregiven voltage value UG is stored for this purpose. This pregiven voltage value UG defines a minimum permissible on-board voltage which ensures that the instrument lighting and/or the headlights do not noticeably darken. The pregiven voltage value UG can be so selected in an advantageous manner that even a slight drop below this value by the instantaneous supply voltage UV does not lead to a noticeable darkening of the instrument lighting and/or of the headlights. The pregiven voltage value UG can, for example, be selected to be 11.8 V. The supply voltage UV in this embodiment is, as a rule, 12 V. The control unit 10 ensures that the instantaneous supply voltage UV does not drop below the pregiven voltage value UG in that the control unit 10 correspondingly limits the current drawn by the motor 15 of the electric charger 1 by means of the drive signal AS. This is especially the case when the charging state of the vehicle battery 5 is poor.

The control unit 10 includes first means 20 for forming the drive signal AS. The drive signal AS inputs the rate of change of speed by which the rpm of the motor 15 of the electric charger is increased in the embodiment described. The drive signal AS can pregive also specifically a desired current drawn by the motor 15, which leads to the corresponding rate of change of speed for the increase of the rpm of the motor 15. The control unit 10 further includes second means 25 for inputting the rate of change of speed for the increase of the rpm of the motor 15 of the electric charger 1 in dependence upon the supplied instantaneous supply voltage UV. The second means 25 are connected to the first means 20 and supply the rate of change of speed, which is determined in dependence upon the instantaneous supply voltage UV, to the first means 20. The drive signal AS is then formed on the basis of this determined rate of change of speed with which the motor 15 is caused to draw the current required for the realization of this rate of change of speed.

Figure 2:
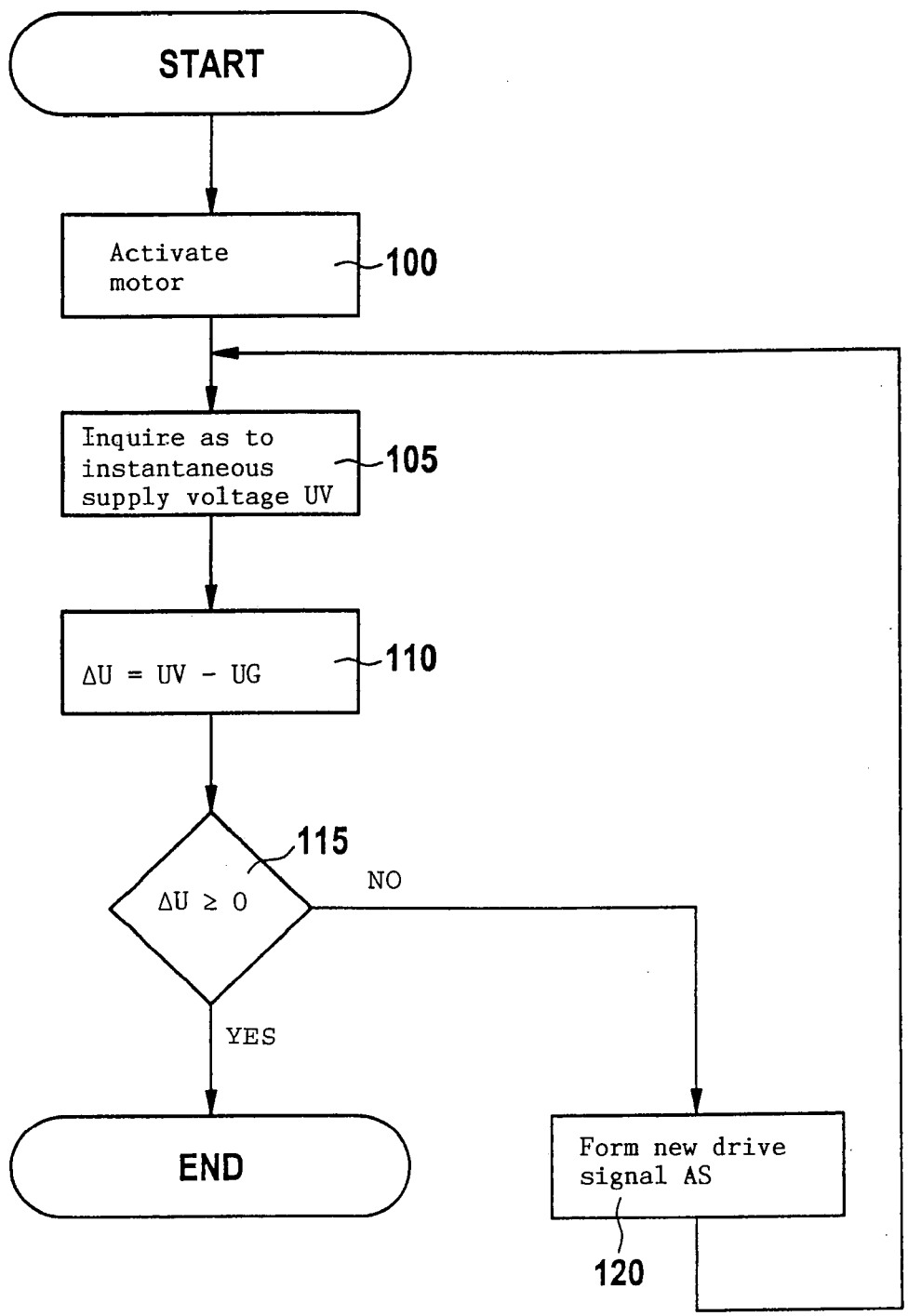

In the sequence diagram of FIG. 2, the method of the invention for controlling the electric charger 1 is explained in greater detail. At program point 100, the first means 20 activate the motor 15 via the drive signal AS and input a rate of change of speed for the increase of the rpm by means of the drive signal AS. This can, for example, be the maximum rate of change of speed or acceleration of the rpm realizable maximally by the motor 15 independently of the instantaneous supply voltage UV. The maximum rate of change of speed can be stored as a reference value in the first means 20. Alternatively, a drive signal AS having a maximum possible level is simply formed by the first means 20 and the motor 15 can thereby be caused to draw the maximum amount of current and thereby to provide the maximum rate of change of speed for the increase of the rpm. Thereafter, the program branches to program point 105. At program point 105, the second means 25 inquires as to the instantaneous supply voltage UV. Thereafter, the program branches to program point 110. At program point 110, the second means 25 forms the voltage difference $\Delta U = UV - UG$. The pregiven voltage value UG can be stored as a reference value in the second means 25. Thereafter, the program branches to program point 115. At program point 115, the second means 25 checks as to whether the voltage difference $\Delta U$ is greater than or equal to zero. If this is the case, there is then a movement out of the program. Otherwise, the program branches at program point 120. At program point 120, the second means 25 causes the first means 20 to form a new drive signal AS having a reduced level in order to reduce the rate of change of speed or the acceleration of the increase of the rpm of the motor 15. This can take place in that, via the drive signal AS, the first means 20 causes the motor 15 to limit the current drawn thereby to a value reduced compared to the previously adjusted value in order to reduce the amount of the voltage difference $\Delta U$. Thereafter, the program branches back to program point 105.

In this way, the instantaneous supply voltage UV can be iteratively brought above or at least to the pregiven voltage value UG and an excessive sudden drop in voltage is essentially prevented which would cause a noticeable darkening of the instrument lighting and/or of the headlights of the vehicle.

With the arrangement and method of the invention, a reduction of the run-up speed or of the rate of change of speed can be achieved for an increase of the rpm of the motor 15 of the electric charger 1 and therefore a reduction of the current drawn by the motor 15 during run-up in dependence upon the instantaneous supply voltage UV and therefore also in dependence upon the charging state of the battery 5.

It is understood that the foregoing description is that of the preferred embodiments of the invention and that various changes and modifications may be made thereto without departing from the spirit and scope of the invention as defined in the appended claims.

What is claimed is:

1. A method for controlling an electrically operated charger for compressing air inducted by an internal combustion engine, the method comprising the steps of:
   determining an instantaneous supply voltage available for the electrically operated charger;
   determining a rate of change of speed for an increase of the rpm of said electrically operated charger in dependence upon said determined instantaneous supply voltage; and,
   forming a drive signal for driving said electrically operated charger at said determined rate of change of speed for an increase of the rpm of said electrically operated charger to compress said air inducted by said internal combustion engine.

2. The method of claim 1, comprising the further step of reducing said rate of change of speed when said instantaneous supply voltage (UV) drops below a pregiven voltage value (UG).

3. The method of claim 1, comprising the further step of providing said rate of change of speed by limiting a current drawn by said electrically operated charger.

4. An arrangement for controlling an electrically operated charger for compressing air inducted by an internal combustion engine, the arrangement comprising:
   means for determining an instantaneous supply voltage available for the electrically operated charger;
   means for determining a rate of change of speed for increasing the rpm of said electrically operated charger in dependence upon said determined instantaneous supply voltage; and,
   means for forming a drive signal for driving said electrically operated charger at said determined rate of change of speed for increasing the rpm of said electrically operated charger to compress said air inducted by said internal combustion engine.

* * * * *

UNITED STATES PATENT AND TRADEMARK OFFICE
CERTIFICATE OF CORRECTION

PATENT NO. : 7,263,832 B2  
APPLICATION NO. : 10/355170  
DATED : September 4, 2007  
INVENTOR(S) : Michael Nau et al.

Page 1 of 1

It is certified that error appears in the above-identified patent and that said Letters Patent is hereby corrected as shown below:

On Title Page:
Above " (51) Int. Cl. " insert:
Item -- (30) Foreign Application Priority Data
January 31, 2002 (DE) . . . . . . . . . . 102 03 974.7 --.

Signed and Sealed this

Eighteenth Day of December, 2007

JON W. DUDAS  
*Director of the United States Patent and Trademark Office*